United States Patent [19]
Dong

[11] Patent Number: 5,939,878
[45] Date of Patent: Aug. 17, 1999

[54] ANGULAR DISPLACEMENT TRANSDUCER HAVING FLUX-DIRECTING TARGET AND MULTI-SECTORED POLE PIECE

[75] Inventor: Chunli Dong, Burnaby, Canada

[73] Assignee: Phoenixcloud Explorations Ltd., Calgary, Canada

[21] Appl. No.: 08/840,933

[22] Filed: Apr. 25, 1997

[51] Int. Cl.⁶ .............. G01B 7/30; G01B 7/14; G01D 5/20; H01F 21/02
[52] U.S. Cl. .............. 324/207.17; 324/207.25
[58] Field of Search .............. 324/207.16, 207.17, 324/207.18, 207.19, 207.25; 310/68 B, 168; 336/30, 45

[56] References Cited

U.S. PATENT DOCUMENTS

| | | |
|---|---|---|
| 3,439,256 | 4/1969 | Kähne . |
| 3,641,429 | 2/1972 | Cox, Jr. et al. . |
| 3,742,340 | 6/1973 | Kiedrowski . |
| 3,806,785 | 4/1974 | DeValroger et al. . |
| 4,044,305 | 8/1977 | Oberbeck . |
| 4,090,131 | 5/1978 | Mas . |
| 4,507,638 | 3/1985 | Brosh . |
| 4,829,247 | 5/1989 | Wallrafen . |
| 5,241,268 | 8/1993 | Lee . |
| 5,247,261 | 9/1993 | Gershenfeld . |
| 5,252,919 | 10/1993 | Uemura . |
| 5,300,882 | 4/1994 | Barros . |
| 5,300,883 | 4/1994 | Richeson . |
| 5,367,256 | 11/1994 | Cooper et al. . |
| 5,369,323 | 11/1994 | Allwine, Jr. . |
| 5,402,096 | 3/1995 | Harris . |
| 5,404,101 | 4/1995 | Logue . |
| 5,497,749 | 3/1996 | Kim . |
| 5,504,427 | 4/1996 | Cooper et al. . |
| 5,559,432 | 9/1996 | Logue . |

FOREIGN PATENT DOCUMENTS 0 512 282 A1  11/1992  European Pat. Off. .
0 592 083 A1  4/1994  European Pat. Off. .

OTHER PUBLICATIONS

Robinson, David T., "Absolute Inductive Position Transducer Offers High–Speed Operation", PCIM, Feb., 1997, pp. 20–27.

Goldie, James H., "Multi–Air Gap Electric Motor Provides High Torque", PCIM, Mar., 1997, pp. 31–41.

*Primary Examiner*—Walter E. Snow
*Attorney, Agent, or Firm*—Oyen Wiggs Green & Mutala

[57] ABSTRACT

An angular displacement transducer has a highly magnetically permeable target which preferentially directs the flux of a fluctuating magnetic field through one of two or more cores. The fluctuating magnetic field induces voltages in secondary windings around the cores. Output signals which vary with the angle of the target about an axis are obtained by connecting pairs of secondary windings differentially. By choosing targets of different shapes the output voltage can be made to vary with angle as a sine wave or as a triangular wave. Transducers according to the invention can be rugged and accurate while retaining a simple construction.

16 Claims, 15 Drawing Sheets

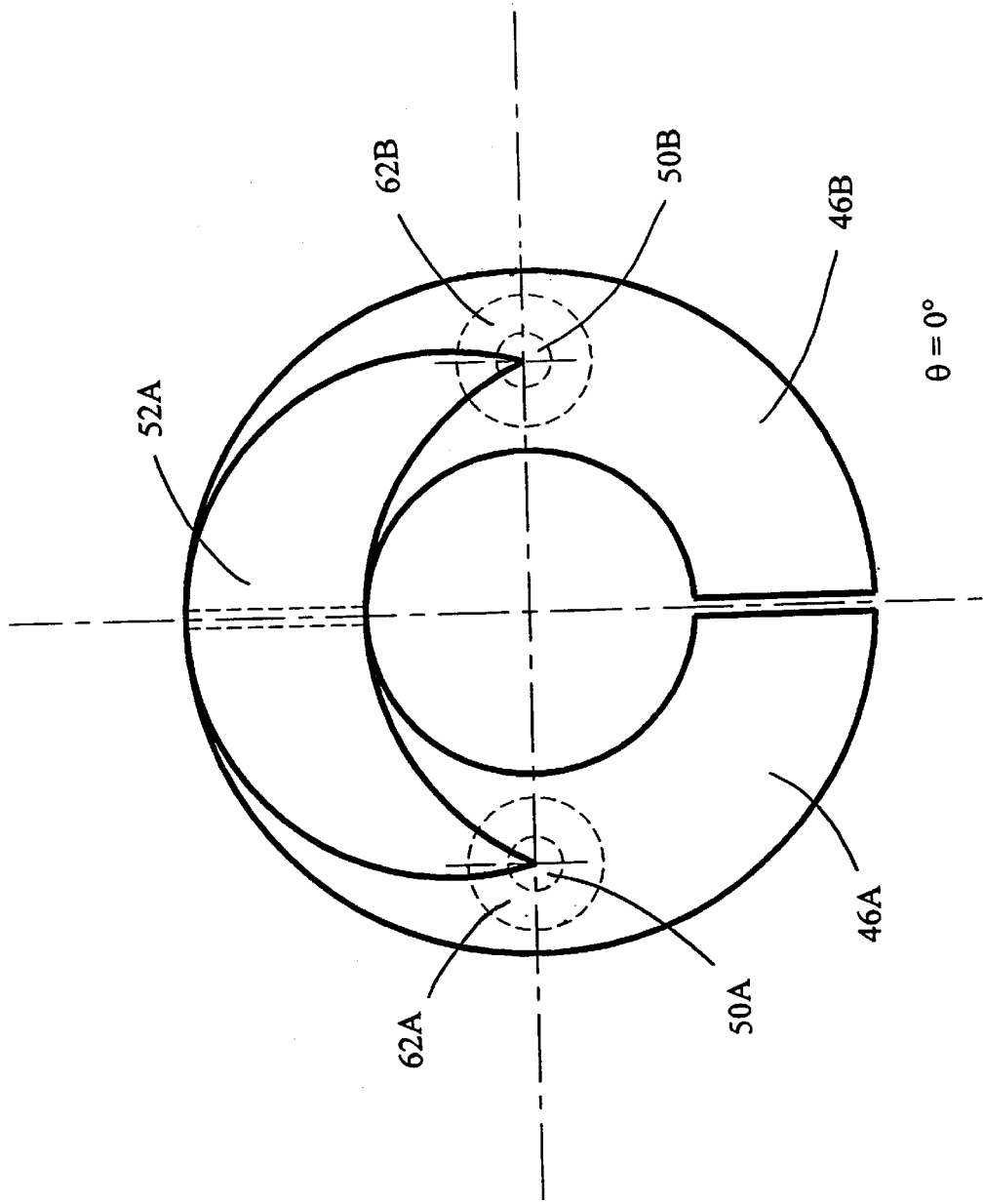

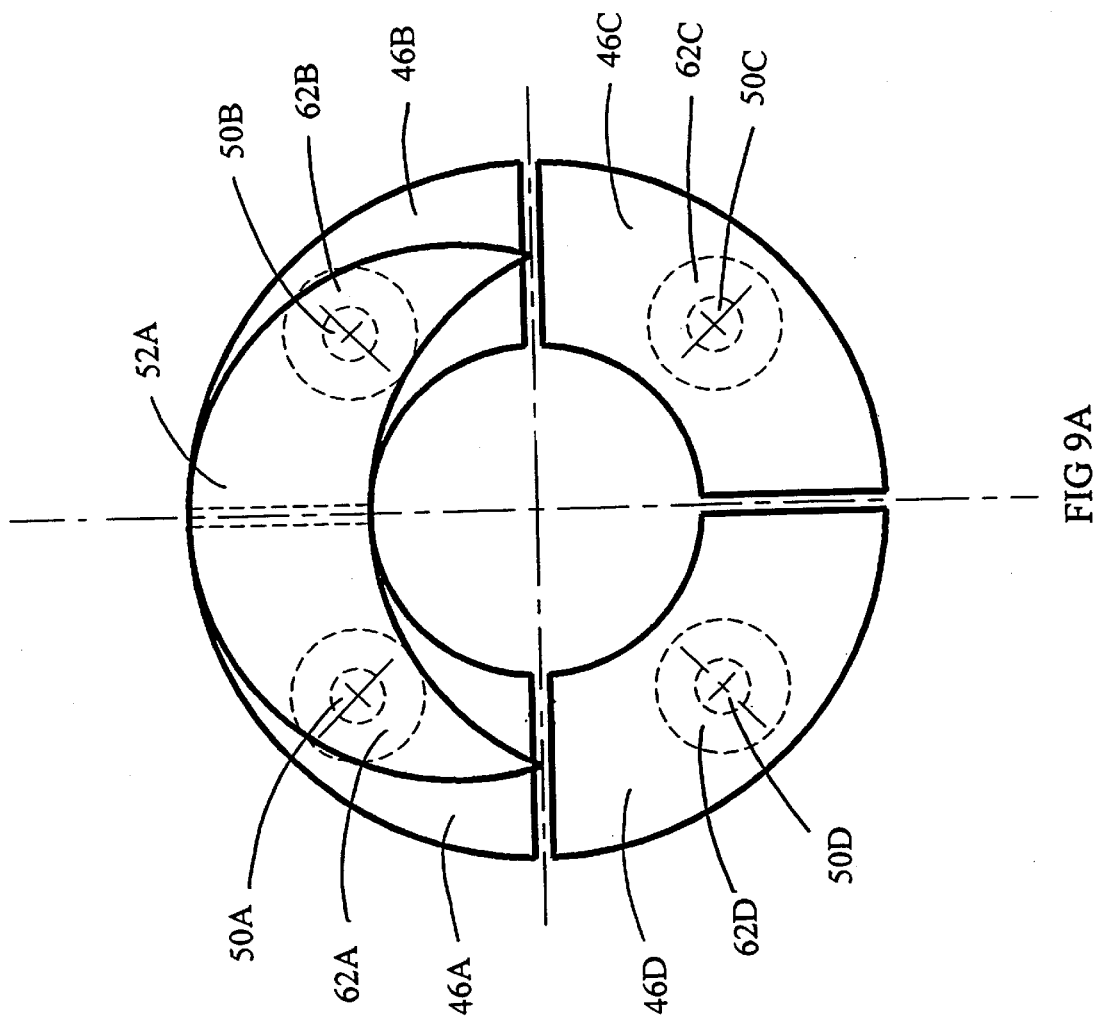

ANGULAR DISPLACEMENT TRANSDUCER HAVING FLUX-DIRECTING TARGET AND MULTI-SECTORED POLE PIECE

TECHNICAL FIELD

This invention relates to apparatus for determining the angular displacement of a part, such as a shaft about an axis.

BACKGROUND

Angular displacement transducers, which produce an electrical signal indicative of the rotational angle of a part, such as a shaft, are widely used in industry. Various designs of incremental and absolute optical encoders as well as electromagnetic or inductive angle sensors, also known as "resolvers", are known. Optical encoders tend to be expensive, fragile and/or have low angular resolutions.

Some electromagnetic angular displacement transducer designs involve mounting a winding on the rotating part adjacent a stationary winding. As the rotating winding turns the electromagnetic coupling between the stationary and rotating windings changes. This, in turn, changes an electrical potential induced in one of the windings by a signal in the other winding. The geometry of these devices generally causes such devices to produce an electrical output which varies sinusoidally with angle.

There are several problems which prior art angular displacement transducers typically share in various combinations. One problem is that accurate transducers according to prior art designs are complicated and expensive to make. A second problem with some prior art angular displacement transducers is that they the relationship between the electrical output signal and the angle being measured can not be easily derived from simple calculations. Many such transducers cannot produce an analog output which varies linearly with angle. As noted above, most such analog transducers produce an output that varies sinusoidally with angle. A third problem is that the prior art does not provide a good selection of angular transducers that can be placed in the center of a shaft and are reasonable in both cost and accuracy. A fourth problem is that most prior art transducers are not easily capable of resolving the relative angular displacement of two shafts. A fifth problem is that many prior art angular displacement transducers are fragile and/or do not work well when wet. Such transducers are not readily usable in settings where there is significant vibration or moisture.

There is a need for simple, rugged, accurate angular displacement transducers. There is a particular need for simple accurate rugged angular displacement transducers which produce output signals which bear a linear relationship to the angle being measured. There is also a need for simple, rugged, accurate angular displacement transducers which produce output signals which bear sinusoidal or other relationships to the angles being measured.

SUMMARY OF INVENTION

The invention provides an angular displacement transducer which avoids limitations of many prior art angular displacement transducers. A first aspect of the invention provides a transducer for measuring the angular displacement of a part. The transducer comprises an annular first pole piece comprising a material having a high magnetic permeability and centered on an axis, a second pole piece comprising a material having a high magnetic permeability spaced apart from the first pole piece by a gap; a primary coil for generating an alternating magnetic field having field lines extending through the first and second pole pieces and the gap; and, a target between the first and second pole pieces in the gap, the target mounted for rotation about the axis and comprising a material having a high magnetic permeability. The first pole piece comprises an annular cap portion comprising a plurality of separated sectors and a core connected to each of the sectors. A secondary winding is wrapped around each of the cores.

In one preferred embodiment of the invention the target is semi-annular. In another preferred embodiment of the invention, the target is crescent shaped.

Another aspect of the invention provides a transducer for measuring the angular displacement of a target about an axis. The transducer comprises: a housing having first and second annular end faces centered on an axis and a cylindrical side face all comprising a highly magnetically permeable material; a circular primary coil in the housing extending peripherally of the first end face adjacent the side face; a first pole piece in the housing, the first pole piece comprising a planar annular cap centered on the axis and comprising one or more pairs of opposed sectors, each sector connected to one of the end faces by a core, the cap and each core comprising a highly magnetically permeable material; an annular second pole piece in the housing connected to another one of the end faces and spaced apart from the first pole piece by a gap, the second pole piece comprising a highly magnetically permeable material; a secondary winding around each of the cores; a target comprising a semi-annular pad of highly magnetically permeable material mounted for rotation about the axis in the gap, the target having a thickness nearly equal to a width of the gap; and, an oscillator connected to the primary coil. The oscillator causes the primary coil to generate an alternating magnetic field in the housing. The alternating magnetic field passes through the first pole piece, the target and the second pole piece, and induces alternating voltages in the secondary windings. The magnitude of the alternating voltage in each secondary winding varies with the degree of overlap between the target and the sector associated with that secondary winding.

Yet another aspect of the invention provides a transducer for measuring the angular displacement of first and second shafts. The transducer comprises annular first and second pole pieces. Each of the pole pieces has an annular cap portion comprising a plurality of separated sectors each of high magnetic permeability and a core having a high magnetic permeability connected to each of the sectors. The transducer also comprises: a magnetically permeable member between the first and second pole pieces and separated from the first and second pole pieces by first and second gaps; a primary coil for generating an alternating magnetic field having field lines extending through said first and second pole pieces, the magnetically permeable member and the first and second gaps; a first target connected for rotation with the first shaft, the first target located in the first gap, the first target mounted for rotation about an axis of the first pole piece and comprising a material having a high magnetic permeability; a second target connected for rotation with the second shaft, the second target located in the second gap, the second target mounted for rotation about an axis of the second pole piece and comprising a material having a high magnetic permeability; a highly magnetically permeable path extending between said cores of said first pole piece and said cores of said second pole piece; and, a secondary winding around each of said cores of said first and second pole pieces.

Still another aspect of the invention comprises a method for measuring the angular displacement of a part around an axis. The method comprises the steps of: generating a fluctuating magnetic field; causing the fluctuating magnetic field to extend through a pair of pole pieces and a gap between the pole pieces, a first one of the pole pieces comprising a two or more sectors, each sector comprising a core passing through a secondary winding; moving a highly magnetically permeable target within the gap to direct substantially all of the magnetic field lines passing through the gap into the portions of the first and second pole pieces adjacent the target; and, measuring the difference in the magnitudes of voltages induced in pairs of the secondary windings.

BRIEF DESCRIPTION OF THE DRAWINGS

In drawings which illustrate specific embodiments of the invention, but which should not be construed as restricting the spirit or scope of the invention in any way:

FIG. 7B is a plan view of an alternative target for use with the invention superimposed on a pole piece;

FIG. 9A is a plan view of a first pole piece having four sectors for use with the invention;

DESCRIPTION

This invention provides angular displacement transducers in which the output voltage depends on the relative magnetic flux from a fluctuating magnetic field passing through each of two or more secondary coils. A highly magnetically permeable target which is connected to the part whose angle is to be measured directs the magnetic field preferentially into one or more of the secondary coils so that the relative flux passing through the secondary coils varies with the angular position of the target.

Figure 1:
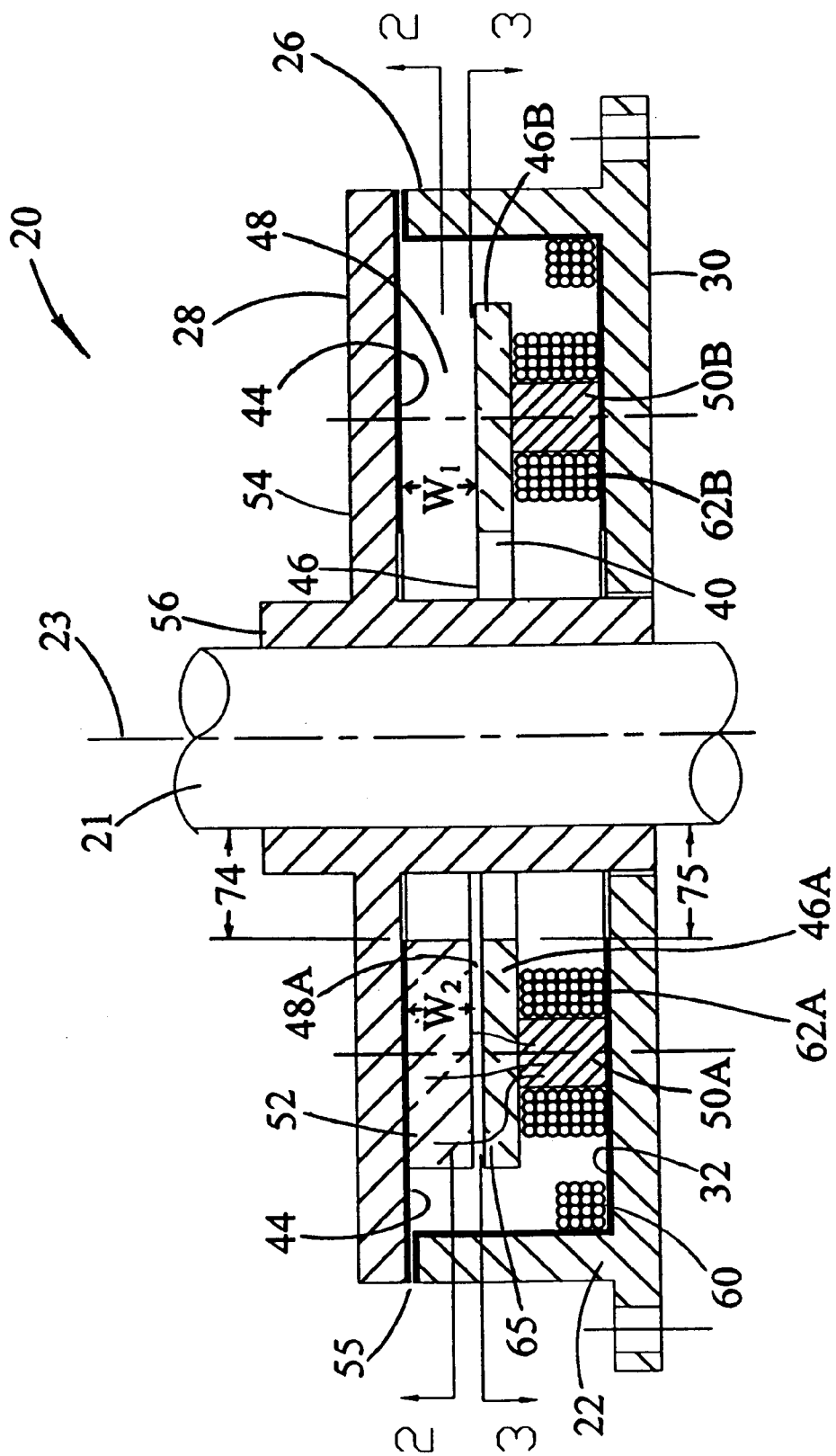
FIG. 1 is a partially schematic section through an angular transducer according to the invention.

FIG. 1 shows a section through a basic embodiment of a transducer 20 according to the invention for measuring the angular rotation of a shaft 21 about an axis 23. Transducer 20 comprises a housing 22 having a generally cylindrical side face 26 and generally annular end faces 28 and 30. Housing 22 is lined with, incorporates, or is made of a highly magnetically permeable material. The material may be, for example, permalloy or supermalloy. In the embodiment of FIG. 1, the highly permeable material is provided in the form of a coating 32 on the inner surface of housing 22.

In this application, "highly magnetically permeable" means a magnetic permeability of at least about 500 and preferably well in excess of about 2,500. For example, modern permalloy materials have magnetic permeabilities in excess of 20,000. In general, it is preferred that those parts which are stated to have high magnetic permeabilities have magnetic permeabilities as high as possible.

Inside housing 22 are a first pole piece 40 and a second pole piece 44 separated by a gap 48. Gap 48 has a width $W_1$. First and second pole pieces 40 and 44 preferably have planar surfaces facing gap 48. Most preferably the facing surfaces of first and second pole pieces 40,44 are perpendicular to axis 23. It is not absolutely necessary that the surfaces of pole pieces 40 and 44 be planar, however, pole pieces 40 and 44 should be circularly symmetrical in respect of axis 23.

Second pole piece 44 may be a portion of end 28 of housing 22, as shown. In the alternative, second pole piece 44 may project inwardly from end 28 of housing 22. First and second pole pieces 40, 44 are preferably both formed from highly magnetically permeable material.

Figure 3:
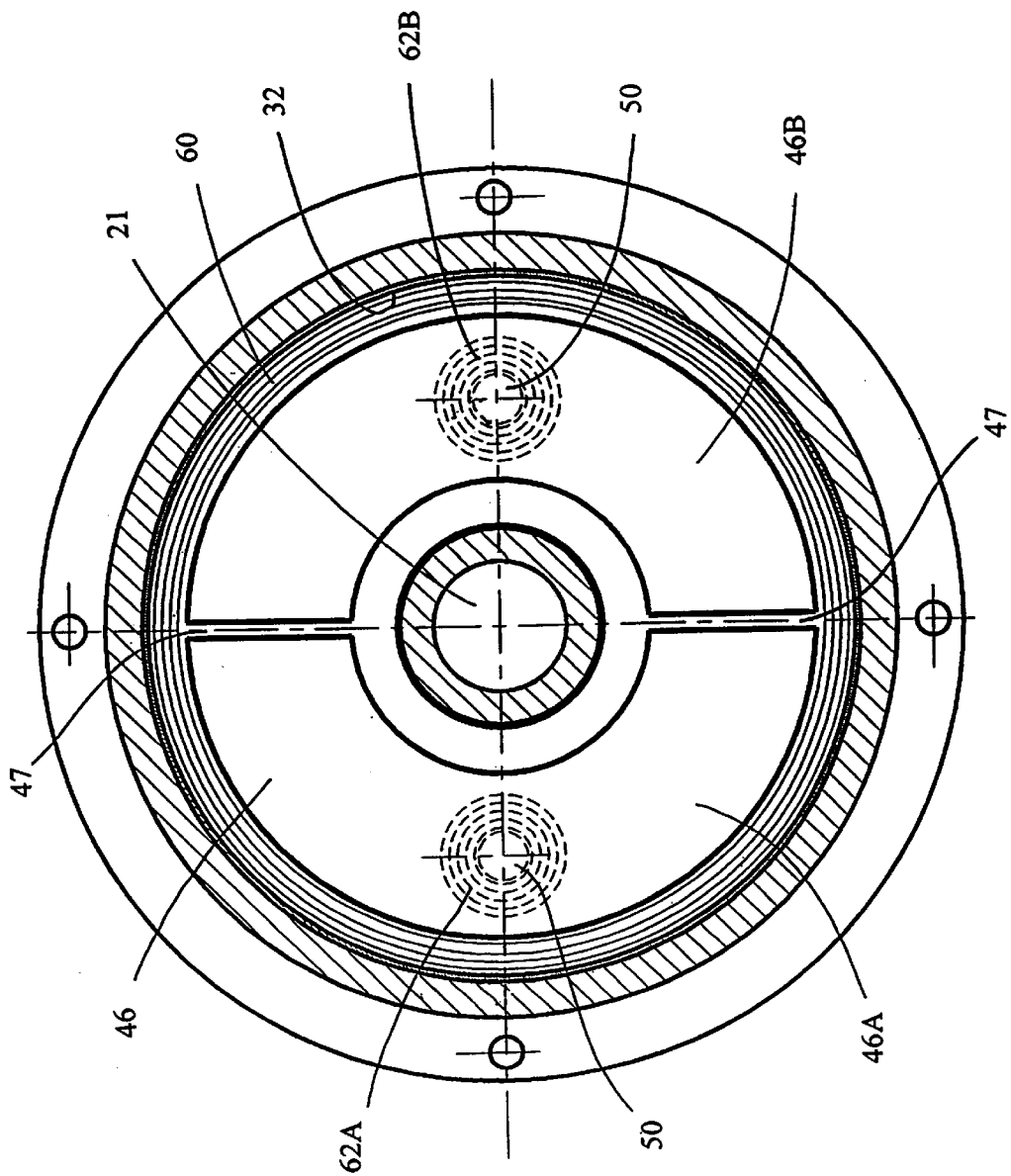
FIG. 3 is a transverse section thereof along the line 3—3.

First pole piece 40 comprises an annular cap 46 which is divided into two C-shaped sectors 46A and 46B (FIG. 3). Sectors 46A and 46B are preferably semi-annular. Sectors 46A and 46B do not contact each other. Sectors 46A and 46B are each connected to end surface 30 of housing 22 by one of cores 50A, 50B. The magnetic permeability of the spaces 47 between sectors 46A and 46B is much smaller than the magnetic permeability of cores 50. The material in spaces 47 may be air or some other material having a low magnetic permeability. In general, spaces 47 should be as narrow as possible while maintaining a magnetic reluctance across spaces 47 which is much greater than the magnetic reluctance of a path extending from any point on the surface of the sector 46A or 46B through the associated core 50A or 50B.

A target 52 is mounted to shaft 21 in gap 48 between poles 40 and 44. Target 52 comprises a highly magnetically permeable material. Target 52 is preferably in the form of a pad of material and preferably has parallel faces having shapes defined by a peripheral edge of target 52. Target 52 preferably has a thickness $W_2$ which is nearly equal to $W_1$. Target 52 is separated from first pole piece 40 by a narrow gap 48A The surfaces of target 52 and first pole piece 40 which define gap 48A are preferably parallel.

Figure 2:
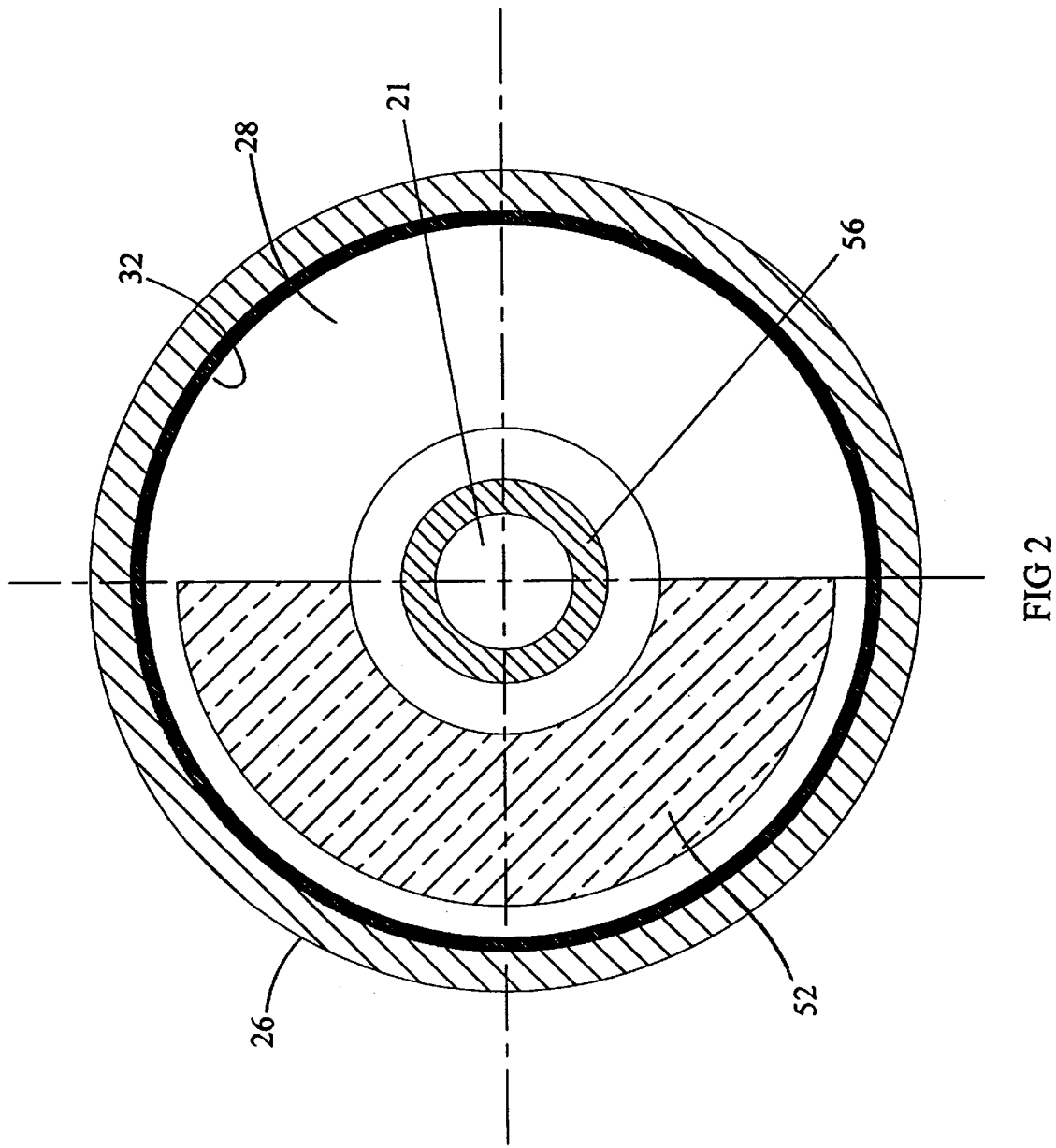
FIG. 2 is a transverse sections thereof along the line 2—2.

As shown in FIG. 2, in one preferred embodiment of the invention, target 52 is semi-annular. Target 52 may be secured to, mounted on or embedded in, a disk 54 which extends flange-like from a collar 56 mounted to shaft 21. In the embodiment of FIG. 1, disk 54 also forms end wall 28 of housing 22. Disk 54 is spaced slightly away from the side wall 26 by a narrow circular gap 55 so that disk 54 can rotate freely with respect to the rest of housing 22. Gap 55 is typically an air gap. While air is not highly magnetically permeable, gap 55 can be made narrow so that it has a reasonably low magnetic reluctance. Further, gap 55 is circularly symmetrical so that its magnetic reluctance does not change appreciably with the angle of rotation of disc 54.

Figure 4:
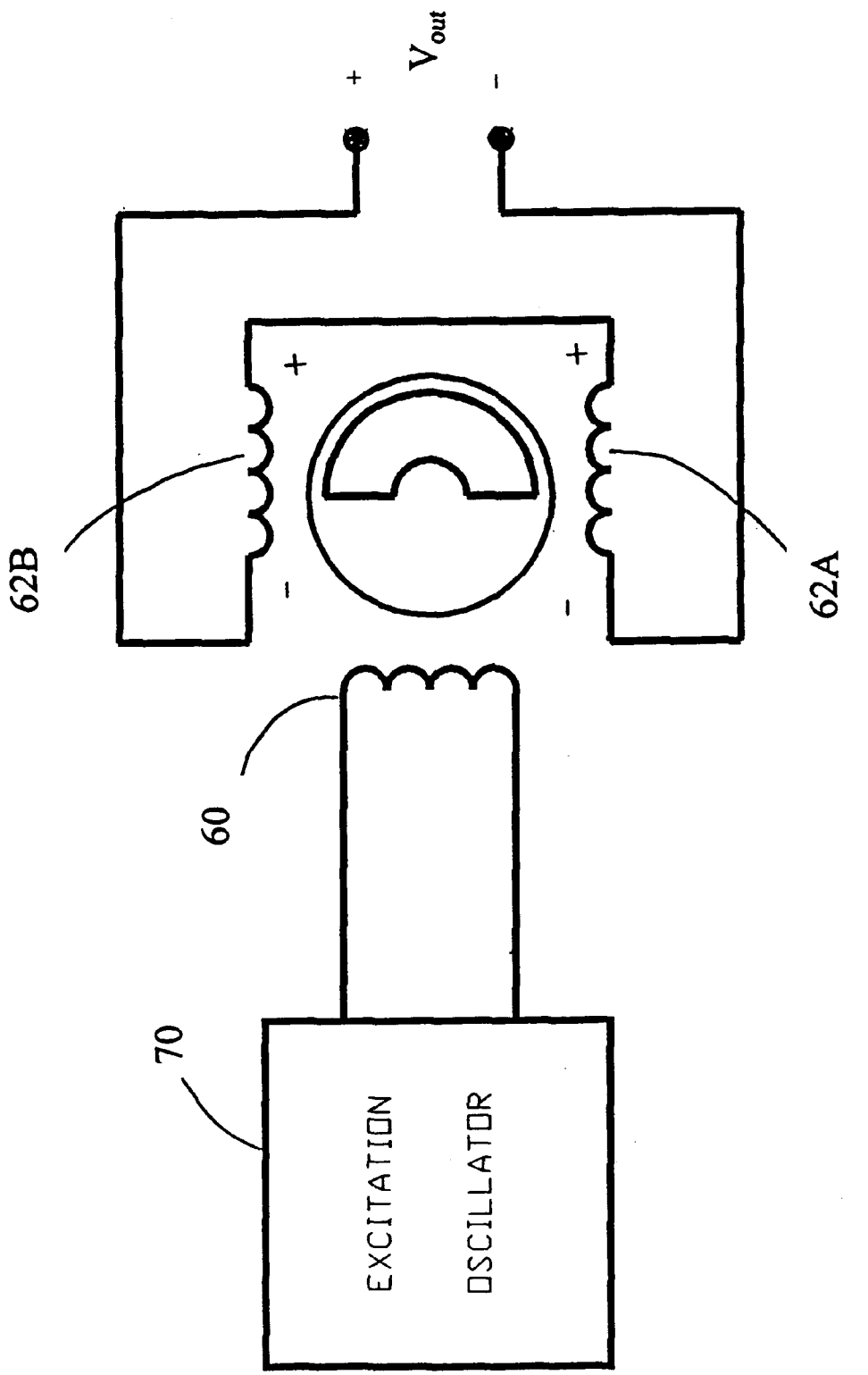
FIG. 4 is a schematic illustrating the electrical connection of windings in the transducer of FIG. 1.

A primary coil 60, or some other means for generating a fluctuating magnetic field, is located inside housing 22. Preferably primary coil 60 is located at the junction between side face 26 and one of end faces 28, 30. A secondary winding (indicated generally by 62) wraps around each of cores 50. Secondary winding 62A wraps around core 50A connected to sector 46A. Secondary winding 62B wraps around core 50B connected to sector 46B. Secondary winding 62A is connected differentially with secondary winding 62B as shown in FIG. 4. As shown in FIG. 4, an oscillator 70 is connected to primary coil 60.

The transducer of FIG. 1 operates as follows. Oscillator 70 generates a alternating current in primary coil 60. The frequency of oscillator 70 is not critical but is typically in the range of about 50 Hertz to 1600 Hertz or so. Frequencies beyond this range may also be used.

Figure 6:
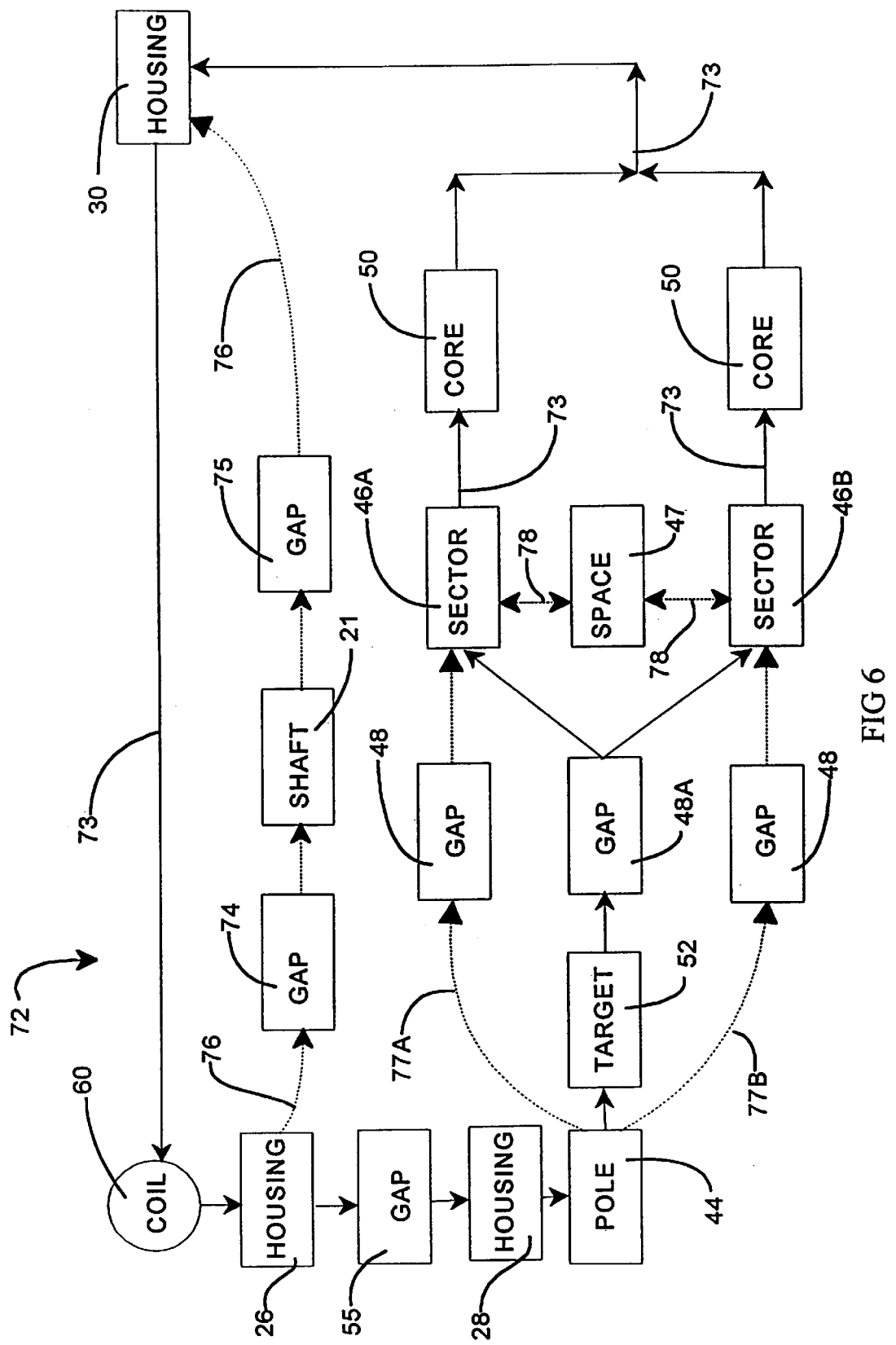
FIG. 6 is a schematic view of the magnetic paths in the transducer of FIG. 1.

The alternating current in primary coil 60 generates an alternating magnetic field in housing 22. The alternating magnetic field extends in a circuit around primary coil 60 as indicated by field lines 65 and as illustrated in FIG. 6. Because magnetic field lines 65 tend to concentrate in material which is highly magnetically permeable, the magnetic field lines 65 generated by primary coil 60 primarily lie in the highly magnetically permeable coating 32 on the inner faces of housing 22. The magnetic field lines extend in loops extending along side wall 26, through gap 55, through second pole piece 44, through gap 48A by way of target 52, and through first pole piece 40. The magnetic reluctance of gap 55 is typically much smaller than that of gap 48A. Gap 48A has a uniform distribution of magnetic flux which passes from target 52 into cap portion 46 of first pole piece 40. Gaps 48A and 55 are preferably small to minimize the magnetic reluctance provided by gaps 48A and 55 and to minimize leakage of magnetic flux from housing 22. Due to the symmetries of the structure shown in FIG. 1, most leakage of magnetic flux will be balanced and will not influence the accuracy of transducer 20 very much.

Magnetic field lines 65 generated by coil 60 which pass through target 52 also pass into and through annular cap 46 of the first pole piece 40. Substantially all of the magnetic field lines which enter annular cap 46 pass through one of cores 50 because cores 50 provide a much more highly magnetically permeable route to coating 32 on end face 30 than any alternative route.

The fluctuating magnetic field passing through cores 50 induces an alternating voltage in secondary windings 62. The voltage induced in any particular secondary winding 62 relative to the other one(s) of secondary windings 62 depends upon the relative amounts of magnetic flux travelling through the cores 50 on which those secondary windings 62 are mounted. This, in turn, depends upon the position of target 52 about axis 23.

The magnetic field in gap 48A, which is the portion of gap 48 between target 52 and cap portion 46, will be reasonably constant over the entire surface of target 52 assuming that gap 48A is small compared to the dimensions of target 52 and the width of gap 48. In practice, this is easily accomplished. Consequently, to a very good first approximation, the amount of magnetic flux directed by target 52 into each of sectors 46A and 46B (and the voltages thereby induced in coils 62A and 62B) depends upon the relative areas of overlap between target 52 and each of sectors 46A and 46B. If extreme accuracy is required then it is necessary to take into account the fact that the magnetic field in the space between target 52 and first pole piece 40 is not completely uniform over the surface of target 52 but varies slightly, particularly in narrow regions along the edges of target 52.

When target 52 is exactly overlapping sector 46A then substantially all of the flux generated by primary coil 60 will travel through core 50A and secondary winding 62A so that a relatively large voltage will be induced in secondary winding 62A. By contrast, substantially no flux will be directed through core 50B and secondary winding 62B will not have any significant voltage induced in it. For example, if target 52 is rotated until it overlaps both of sectors 46A and 46B by the same amount, then the same amount of magnetic flux will travel through each of cores 50A and 50B and secondary windings 62A and 62B will have equal voltages induced in them.

Those skilled in the art will recognize that a transducer generally as shown in FIG. 1 can be made to be rugged. A further advantage of the transducer of FIG. 1 is that it does not require any electrical connections to any moving parts.

FIG. 6 shows a schematic view of the magnetic circuit 72 formed in the apparatus of FIG. 1. The main path 73 followed by magnetic flux lines 65 is indicated by solid lines. The main possible undesirable leakage paths are indicated by dotted lines. Magnetic circuit 72 can be viewed as a series of elements connected in a series-parallel configuration. Each element has a magnetic reluctance which depends upon its geometry and is inversely proportional to the magnetic permeability of the material(s) from which it is made.

One possible leakage path 76 extends from end 28 of housing 22, through gap 74 (FIG. 1) to shaft 21, and through gap 75 (FIG. 1) to end 30 of housing 22. The magnetic reluctance of path 76 can be made to be much higher than the magnetic reluctance of main path 73 by ensuring that gaps 74 and 75 are significantly larger than gaps 55 and 48A.

Second leakage paths 77A and 77B extend from second pole piece 44 across gap 48 to sectors 46A and 46B of first pole piece 40 respectively. These leakage paths are also undesirable because, for optimum operation, substantially all of the magnetic flux passing through sectors 46A and 46B of first pole piece 40 should be directed through target 52. Leakage through paths 77A and 77B can be substantially eliminated by making gap 48A much smaller than gap 48. If this is done then substantially all of the magnetic flux will pass through target 52 and gap 48A rather than passing through gap 48 between first and second pole pieces 40, 44 in their portions away from target 52. Target 52 is much more magnetically permeable than air (or any portions of disk 54 which might project into gap 48).

Third leakage paths 78 extend between sectors 46A and 46B through gap 47. Leakage through paths 78 can be substantially eliminated by ensuring that gaps 47 are wide enough that the magnetic reluctance between sectors 46A, 46B and housing 28 through cores 50 is much lower than the magnetic reluctance offered by spaces 47.

Figure 5:
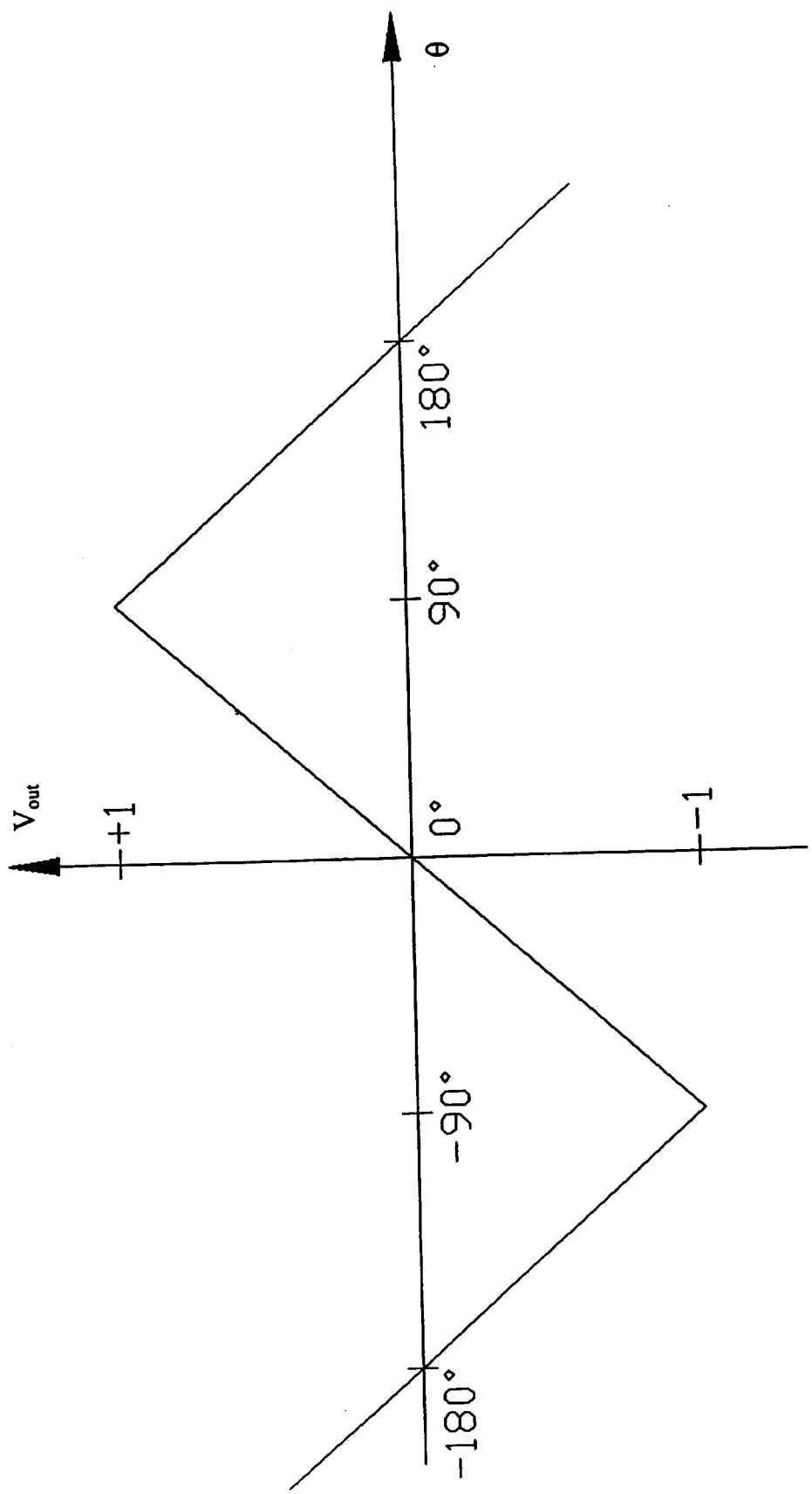
FIG. 5 is a plot of the output voltage of the transducer of FIG. 1 as a function of angle.

As shown in FIG. 4, it is convenient to connect windings 62A and 62B differentially. The output of transducer 20 is then the magnitude of the voltage $V_{out}$. FIG. 5 shows the variation in the magnitude of $V_{out}$ with angle $\theta$. It can be seen that $V_{out}$ varies linearly with $\theta$. It will be understood that where the magnitude of $V_{out}$ is shown as having a negative value, $V_{out}$ is out of phase with the signal produced by oscillator 70. Where $V_{out}$ is shown as having a positive value, $V_{out}$ is in phase with the signal produced by oscillator 70.

It is apparent that a transducer 20 according to the invention may be hollow along axis 23 so that transducer 20 may be mounted anywhere along a shaft 21. It is not necessary for transducer 20 to be at one end of shaft 21

(although there is no reason why transducer 20 could not be mounted at one end of shaft 21).

In some circumstances it can be desirable to vary the shape of the curve relating $V_{out}$ and $\theta$. For example, in some circumstances it may be desirable to have $V_{out}$ and $\theta$ related by a sinusoidal curve.

The shape of the curve relating $V_{out}$ and $\theta$ may be changed by changing the shape of target 52. This changes the way in which the overlap between the target and the sectors on first pole piece 40 varies with the angle of the target relative to the first pole piece. One advantage of a transducer according to the invention is that it is relatively easy to design a target 52 which will produce a desired output.

Figure 7A:
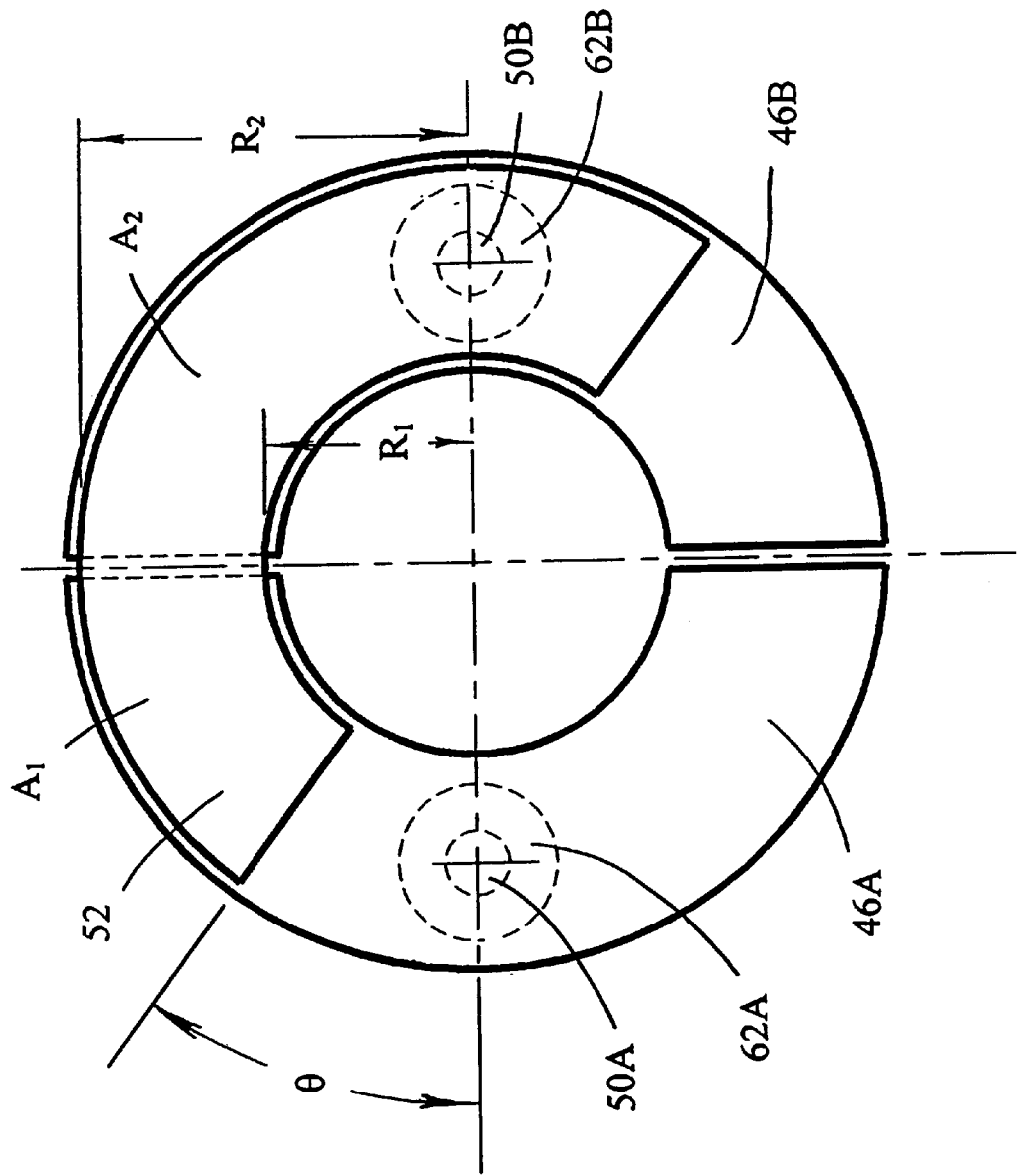
FIG. 7A is a plan view of a semi-annular target superimposed on a pole piece.

When target 52 is at a given angle $\theta$, as shown in FIG. 7A, then $V_{out}$ is given to a good approximation by:

$$V_{out}=(A_1-A_2)\times K \qquad (1)$$

where: $A_1$ is the area of overlap between target 52 and sector 46A of first pole piece 40; $A_2$ is the area of overlap between target 52 and sector 46B of first pole piece 40; and K is a constant. The change in $V_{out}$ for small changes in $\theta$ is given by:

$$\Delta V_{out}\approx K\times(R_2^2-R_1^2)\times\Delta\theta \qquad (2)$$

where: $\Delta V_{out}$ is the change in $V_{out}$; $R_2$ is the radius of the outermost portion of target 52 along space 47; $R_1$ is the radius of the innermost portion of target 52 along space 47; and $\Delta\theta$ is the small change in $\theta$. More exact calculations of the changes in areas $A_1$ and $A_2$ with changes in $\theta$, and the resulting changes in $V_{out}$ can be made in ways which will be clear to those skilled in the art in light of this disclosure. Corrections for edge effects and the like may be made by slightly changing the shape of target 52.

Figure 8:
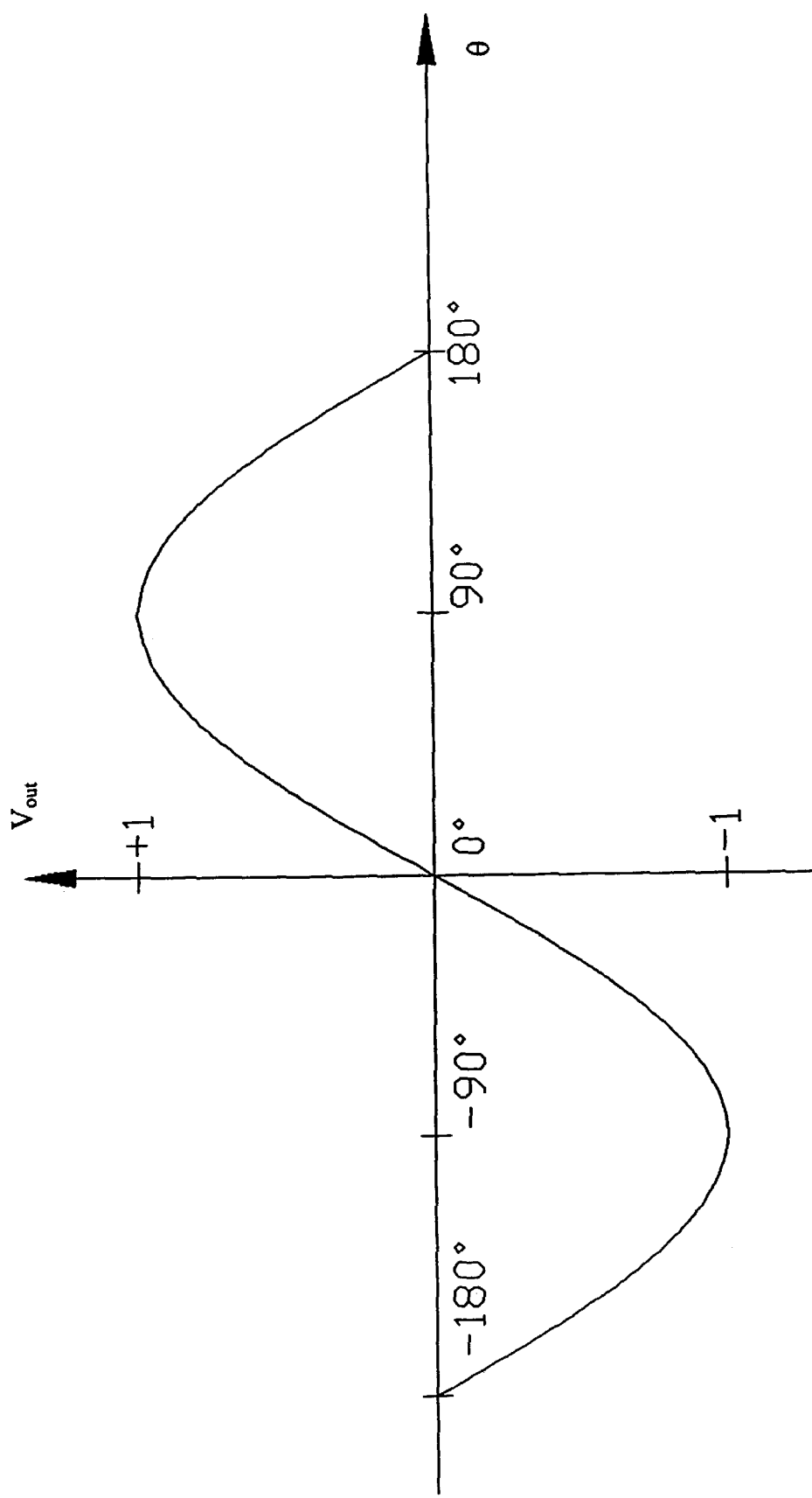
FIG. 8 is a plot of the output voltage of the transducer of FIG. 1 as a function of angle with the target of FIG. 7B.

For example, FIG. 7B shows an alternative crescent shaped target 52A which, when used in the transducer of FIG. 1 in place of semi-annular target 52, produces a sinusoidal output curve, as shown in FIG. 8.

Figure 9B:
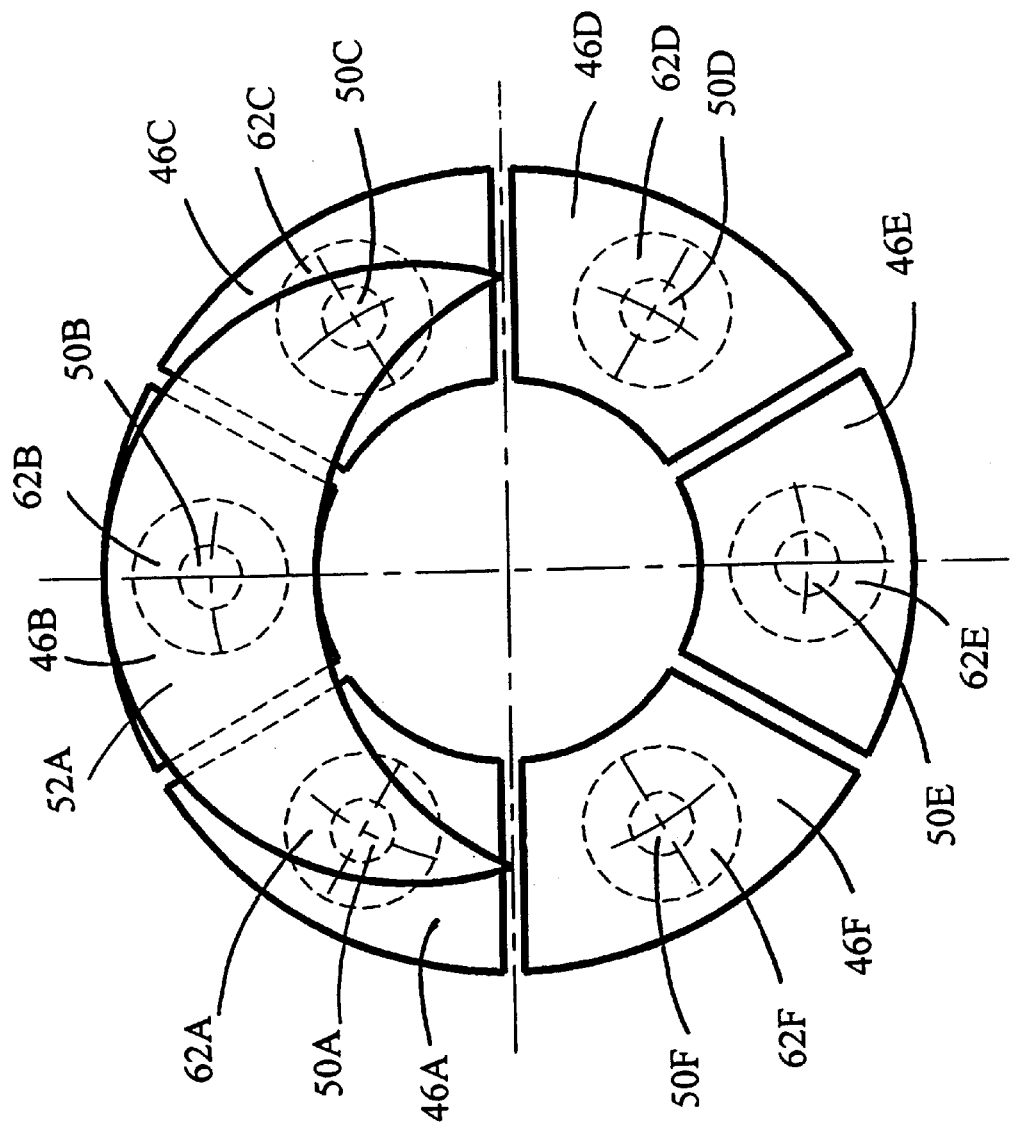
FIG. 9B is a plan view of a first pole piece having six sectors for use with the invention.

The invention is not limited to the use of first pole pieces which include only two sectors. For example, FIG. 9A shows a top plan view of a first pole piece comprising four sectors 46A, 46B, 46C, and 46D, four corresponding cores 50A through 50D, and four secondary windings 62A through 62D. FIG. 9B shows a top plan view of a first pole piece comprising six sectors, six cores 50 and six secondary windings 62. The pole pieces of FIGS. 9A and 9B may be used with targets 52 of various shapes. For example, the pole pieces of FIGS. 9A and 9B may be used with semi-annular targets or crescent shaped targets as described above. The preferred form for a pole piece 40 for use with a semi-annular target has two semi-annular sectors 46A and 46B.

Figure 10A:
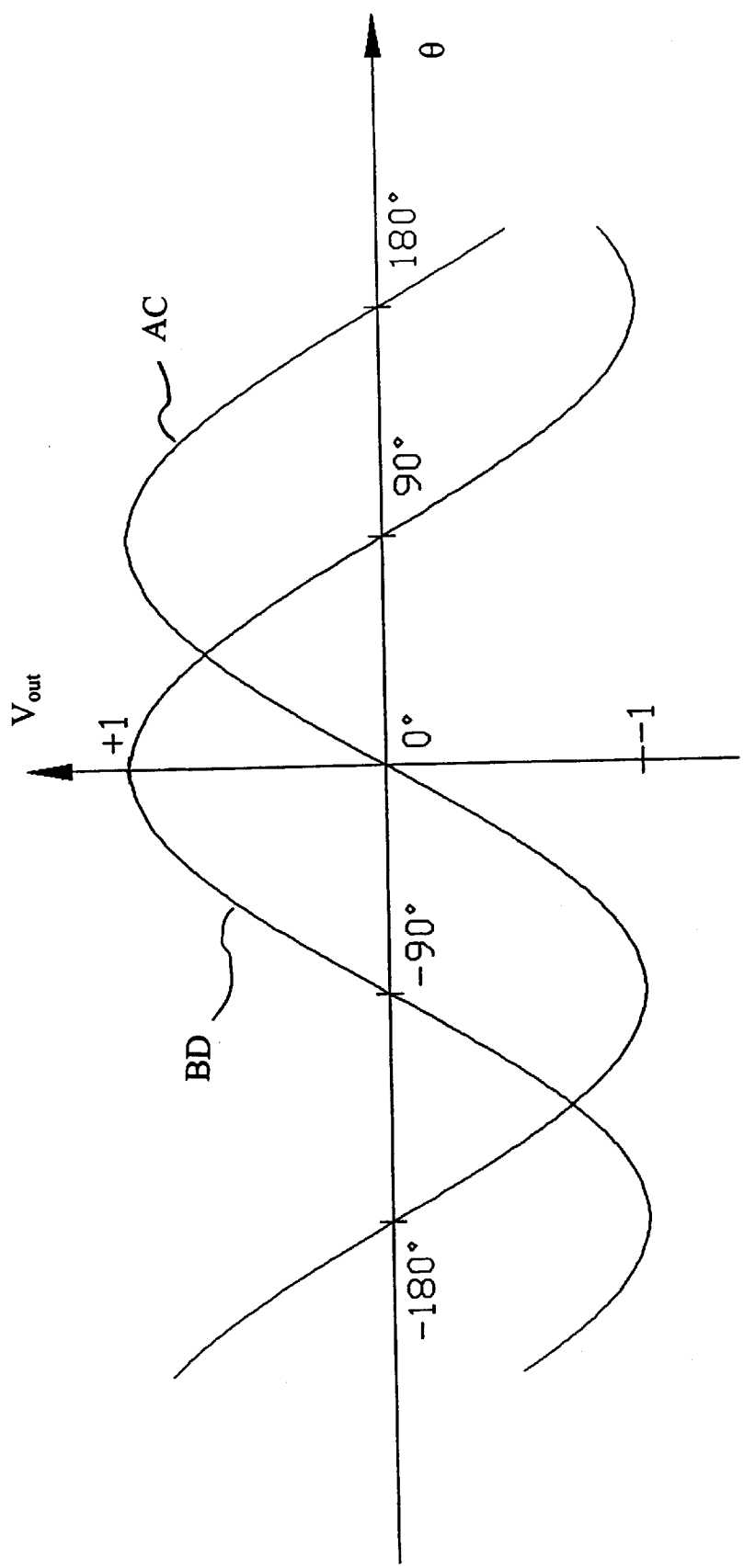
FIG. 10A is a plot of the output voltage of a transducer equipped with the first pole piece of FIG. 9A as a function of angle with the target of FIG. 7B.
Figure 10B:
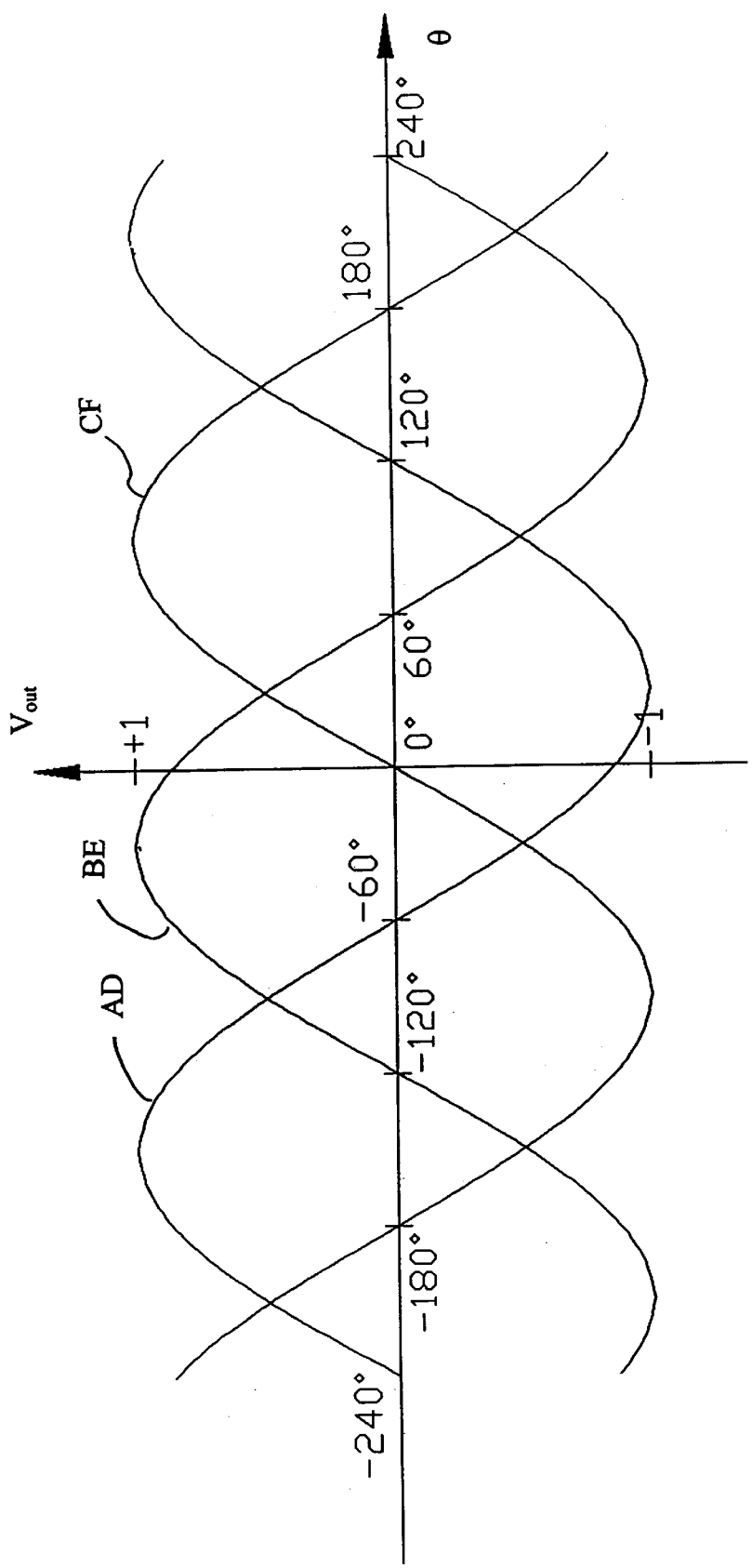
FIG. 10B is a plot of the output voltage of a transducer equipped with the first pole piece of FIG. 9B as a function of angle with the target of FIG. 7B.

The pole pieces of FIGS. 9A and 9B may be used to provide transducers which provide several outputs which are phase shifted relative to one another. Preferably in such embodiments, the outputs are each provided by connecting secondary coils 62 in opposed sectors in differential relationship to one another. For example, in the embodiment of FIG. 9A, a first output can be derived by connecting secondary windings 62A and 62C differentially and a second output may be derived by connecting windings 62B and 62D differentially. In the embodiment of FIG. 9B, three outputs may be provided by connecting the secondary windings differentially in the pairs 62A–62D; 62B–62E; and 62C–62F. If this is done and a target 52A is used as shown in FIG. 7 then the three output voltages produced by the pole pieces of FIGS. 9A and 9B used in the apparatus of FIG. 1 will be generally as shown in FIGS. 10A and 10B respectively.

Figure 11:
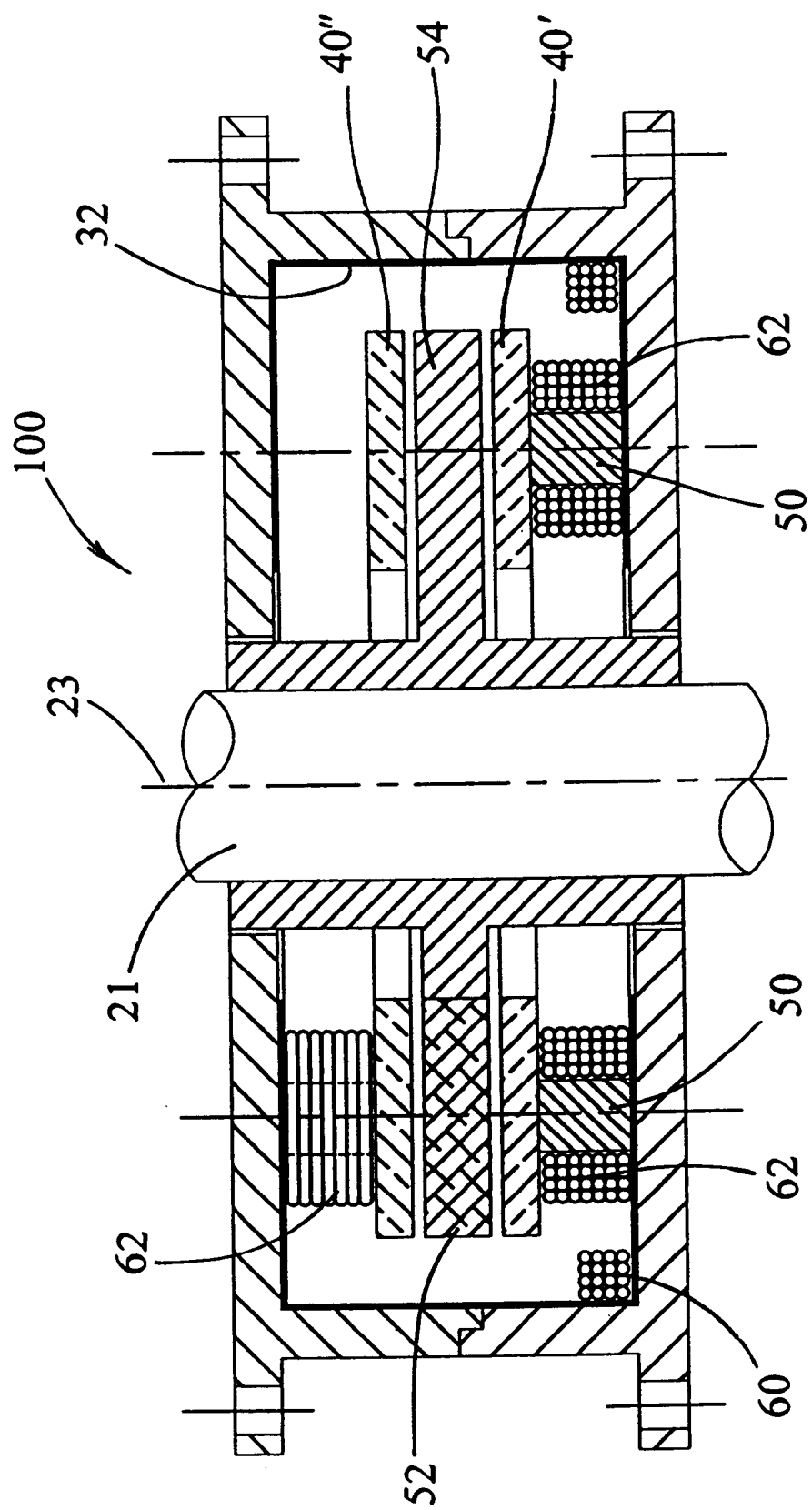
FIG. 11 is a transverse section through a transducer according to the invention having two first pole pieces shifted relative to each other; and, FIG. 12 is a transverse section through an embodiment of the invention adapted to measure the relative angle between two shafts.

In the embodiments described above, second pole piece 44 has only been used to direct magnetic flux generated by primary coil 60 into target 52. The embodiment of the invention shown in FIG. 11, is a transducer 100 having two pole pieces, 40' and 40", both of which are constructed generally in the manner of the first pole piece 40 of FIG. 1. Pole piece 40' is shifted angularly relative to pole piece 40" by an angle $\phi$. Preferably $\phi$ is a multiple of 15 degrees. A disc 54 containing an embedded target 52 is located in the gap 48 between the pole pieces.

Transducer 100 uses a single primary coil 60 and a single target 52. However, it provides two sets of output voltages, one from pole piece 40' and one from pole piece 40". The pole pieces 40' and 40" each yield a separate output signal (or set of output signals). The two output signals (or sets of output signals) may be used independently and/or used in combination to increase the accuracy of transducer 100 or to resolve any ambiguity as to the angle of shaft 21 that may be present in one of the sets of output signals.

In transducer 100, pole pieces 40' and 40" may each have 2, 4, 6, or more sectors. It is not necessary for both of pole pieces 40' and 40" to have the same number of sectors. Target 52 may be semi-annular, as shown in FIG. 2, crescent-shaped, or some other shape.

Figure 12:
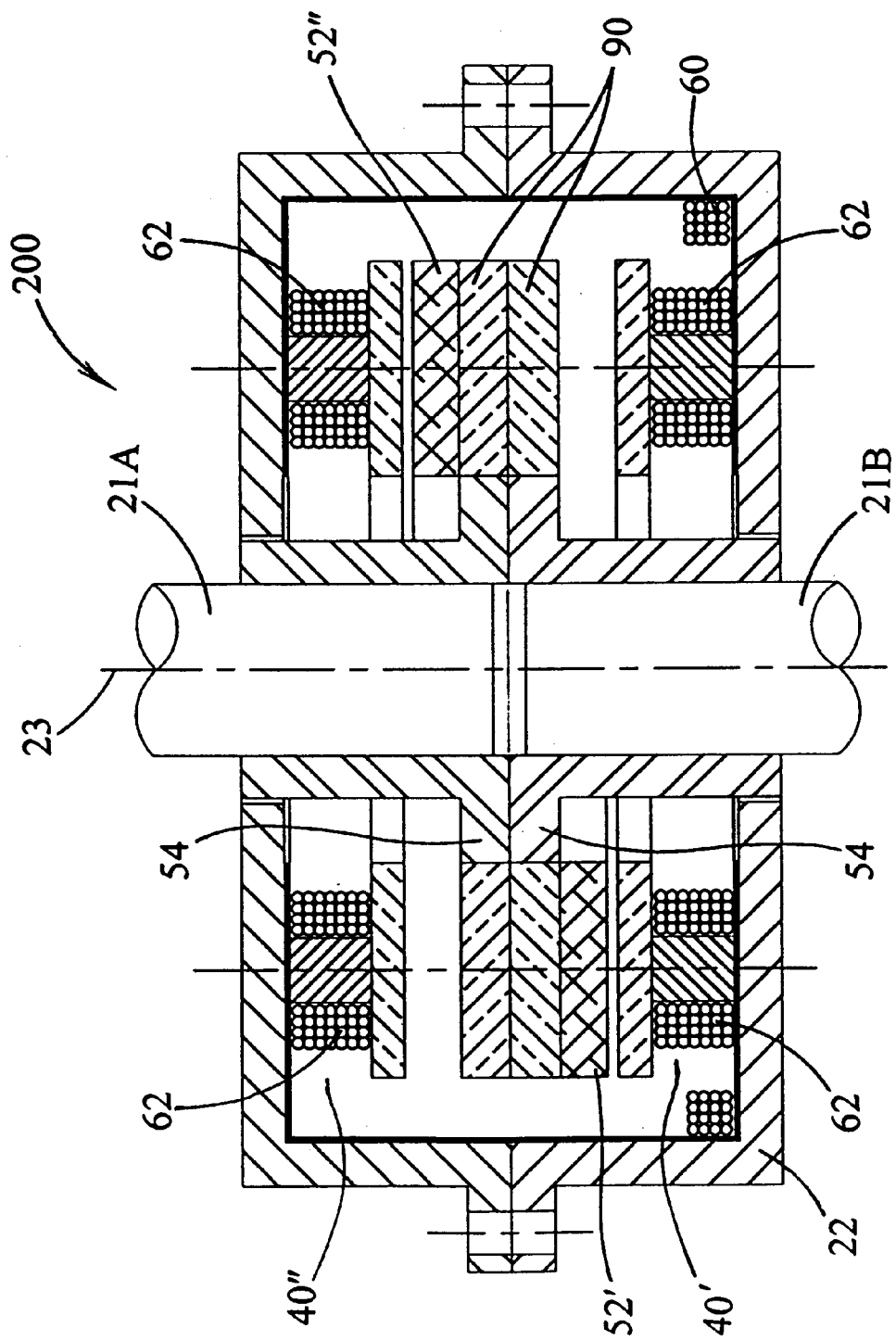

FIG. 12 shows a transducer 200 according to a further alternative embodiment of the invention for simultaneously measuring the angles of rotation of two shafts 21A and 21B which are coaxial along an axis 23. Transducer 200 has two pole pieces 40' and 40"; two targets 52' and 52" respectively adjacent pole pieces 40' and 40"; and a central member 90 of a highly magnetically permeable material. Targets 52' and 52" are respectively connected to shafts 21' and 21". Transducer 200 is essentially a pair of transducers 20 (as shown in FIG. 1) connected back-to-back and sharing a single coil 60.

The magnetic field generated by coil 60 passes through housing 22, through one or more sectors of pole piece 40', through target 52', through central member 90, through target 52", and through pole piece 40" back to housing 22. Outputs from the coils 62 in pole pieces 40' and 40" vary respectively with the angle of rotation of shafts 21' and 21" about axis 23 as described above. Central member 90 is symmetrical with respect to axes 23 and is highly magnetically permeable so that the output derived from pole piece 40' is independent of the output derived from pole piece 40" and vice versa.

In transducer 200, pole pieces 40' and 40" may each have 2, 4, 6, or more sectors. It is not necessary for both of pole pieces 40' and 40" to have the same number of sectors. Targets 52' and 52" may be semi-annular, as shown in FIG. 2, crescent-shaped, or some other shape.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A transducer for measuring the angular displacement of a part, the transducer comprising:
   (a) an annular first pole piece comprising a material having a high magnetic permeability and centered on axis, the first pole piece comprising an annular cap portion comprising a plurality of separated sectors and a core connected to each of said sectors;
   (b) a second pole piece comprising a material having high magnetic permeability spaced apart from the first pole piece by a gap;

(c) primary coil for generating an alternating magnetic field having field lines extending through said first and second pole pieces and said gap;

(d) a target between said first and second pole pieces in said gap, the target mounted for rotation about said axis and comprising a material having a high magnetic permeability; and, (e) a secondary winding around each of said cores, wherein said second pole piece comprises an annular cap portion comprising a plurality of separated sectors and a core connected to each of said sectors wherein boundaries of said sectors of said second pole piece are offset through an angle about said axis relative to boundaries of said sectors on said first pole piece.

2. The transducer of claim 1 wherein each of the first and second pole pieces comprise two semi-annular sectors.

3. The transducer of claim 1 wherein the offset angle is a multiple of 15 degrees.

4. A transducer for measuring the angular displacement of a part, the transducer comprising:

(a) an annular first pole piece comprising a material having a high magnetic permeability and centered on an axis, the first pole piece comprising an annular cap portion comprising a plurality of separated sectors and a core connected to each of said sectors;

(b) a second pole piece comprising a material having a high magnetic permeability spaced apart from the first pole piece by a gap;

(c) a primary coil for generating an alternating magnetic field having field lines extending through said first and second pole pieces and said gap;

(d) a target between said first and second pole pieces in said gap, the target mounted for rotation about said axis and comprising a material having a high magnetic permeability; and, (e) a secondary winding around each of said cores, wherein the first pole piece comprises 2 semi-annular sectors.

5. The transducer of claim 4 wherein said target is semi-annular and said semi-annular sectors are substantially identical, each sector extending through an arc of approximately 180 degrees relative to said axis.

6. The transducer of claim 4 wherein said target is crescent shaped and extends through an angle of about 180 degrees relative to said axis, and said semi-annular sectors are substantially identical, each sector extending through an arc of approximately 180 degrees relative to said axis.

7. A transducer for measuring the angular displacement of a part, the transducer comprising:

(a) an annular first pole piece comprising a material having a high magnetic permeability and centered on an axis, the first pole piece comprising an annular cap portion comprising a plurality of separated sectors and a core connected to each of said sectors;

(b) a second pole piece comprising a material having a high magnetic permeability spaced apart from the first pole piece by a gap;

(c) a primary coil for generating an alternating magnetic field having field lines extending through said first and second pole pieces and said gap;

(d) a target between said first and second pole pieces in said gap, the target mounted for rotation about said axis and comprising a material having a high magnetic permeability; and, (e) a secondary winding around each of said cores, wherein the first pole piece comprises 6 symmetrical sectors.

8. The transducer of claim 7 wherein said target is semi-annular.

9. The transducer of claim 7 wherein said target is crescent shaped and extends through an angle of about 180 degrees relative to said axis.

10. A transducer for measuring the angular displacement of a part, the transducer comprising:

(a) an annular first pole piece comprising a material having a high magnetic permeability and centered on an axis, the first pole piece comprising an annular cap portion comprising a plurality of separated sectors and a core connected to each of said sectors;

(b) a second pole piece comprising a material having a high magnetic permeability spaced apart from the first pole piece by a gap;

(c) a primary coil for generating an alternating magnetic field having field lines extending through said first and second pole pieces and said gap;

(d) a semi-annular target between said first and second pole pieces in said gap, the target mounted for rotation about said axis and comprising a material having a high magnetic permeability; and, (e) a secondary winding around each of said cores wherein said first pole piece comprises four substantially identical sectors, each sector extending through an arc of approximately 90 degrees relative to said axis.

11. A transducer for measuring the angular displacement of a part, the transducer comprising:

(a) an annular first pole piece comprising a material having a high magnetic permeability and centered on an axis, the first pole piece comprising an annular cap portion comprising a plurality of separated sectors and a core connected to each of said sectors;

(b) a second pole piece comprising a material having a high magnetic permeability spaced apart from the first pole piece by a gap;

(c) a primary coil for generating an alternating magnetic field having field lines extending through said first and second pole pieces and said gap;

(d) a semi-annular target between said first and second pole pieces in said gap, the target mounted for rotation about said axis and comprising a material having a high magnetic permeability; and, (e) a secondary winding around each of said cores, wherein the first pole piece comprises an annular cap portion comprising a plurality of pairs of opposed symmetrical sectors.

12. A transducer for measuring the angular displacement of a part, the transducer comprising:

(a) an annular first pole piece comprising a material having a high magnetic permeability and centered on an axis, the first pole piece comprising an annular cap portion comprising a plurality of separated sectors and a core connected to each of said sectors;

(b) a second pole piece comprising a material having a high magnetic permeability spaced apart from the first pole piece by a gap;

(c) a primary coil for generating an alternating magnetic field having field lines extending through said first and second pole pieces and said gap;

(d) a crescent shaped target, extending through an angle of about 180 degrees relative to said axis, between said first and second pole pieces in said gap, the target mounted for rotation about said axis and comprising a material having a high magnetic permeability; and, (e) a secondary winding around each of said cores, wherein said first pole piece comprises four substantially identical sectors, each sector extending through an arc of approximately 90 degrees relative to said axis.

13. A transducer for measuring the angular displacement of a part, the transducer comprising:
   (a) an annular first pole piece comprising a material having a high magnetic permeability and centered on an axis, the first pole piece comprising an annular cap portion comprising a plurality of separated sectors and a core connected to each of said sectors;
   (b) a second pole piece comprising a material having a high magnetic permeability spaced apart from the first pole piece by a gap;
   (c) a primary coil for generating an alternating magnetic field having field lines extending through said first and second pole pieces and said gap;
   (d) a crescent shaped target, extending through an angle of about 180 degrees relative to said axis, between said first and second pole pieces in said gap, the target mounted for rotation about said axis and comprising a material having a high magnetic permeability; and,
   (e) a secondary winding around each of said cores, wherein the first pole piece comprises an annular cap portion comprising a plurality of pairs of opposed symmetrical sectors.

14. A transducer for measuring the angular displacement of a part, the transducer comprising:
   (a) an annular first pole piece comprising a material having a high magnetic permeability and centered on an axis, the first pole piece comprising an annular cap portion comprising a plurality of sectors and a core connected to each of said sectors, each sector of the cap portion having first and second edges extending radially from the axis;
   (b) a second pole piece comprising a material having a high magnetic permeability spaced apart from the first pole piece by a gap;
   (c) a primary coil for generating an alternating magnetic field having field lines extending through said first and second pole pieces and said gap;
   (d) a target between said first and second pole pieces in said gap, the target mounted for rotation about said axis and comprising a material having a high magnetic permeability; and,
   (e) a secondary winding around each of said cores.

15. The transducer of claim 14 wherein the cap portion is symmetrical with respect to 120 degree rotations about the axis.

16. A transducer for measuring the angular displacement of first and second shafts, the transducer comprising:
   (a) annular first and second pole pieces, each of the pole pieces an annular cap portion comprising a plurality of separated sectors each of high magnetic permeability and a core having a high magnetic permeability connected to each of the sectors;
   (b) a magnetically permeable member between the first and second pole pieces and separated from the first and second pole pieces by first and second gaps;
   (c) a primary coil for generating an alternating magnetic field having field lines extending through said first and second pole pieces, the magnetically permeable member and the first and second gaps;
   (d) a first target connected for rotation with the first shaft, the first target located in the first gap the first target mounted for rotation about an axis of the first pole piece and comprising a material having a high magnetic permeability;
   (e) a second target connected for rotation with the second shaft, the second target located in the second gap the second target mounted for rotation about an axis of the second pole piece and comprising a material having a high magnetic permeability;
   (f) a highly magnetically permeable path extending between said cores of said first pole piece and said cores of said second pole piece; and,
   (g) a secondary winding around each of said cores of said first and second pole pieces.

* * * * *